United States Patent Office 3,347,259
Patented Oct. 17, 1967

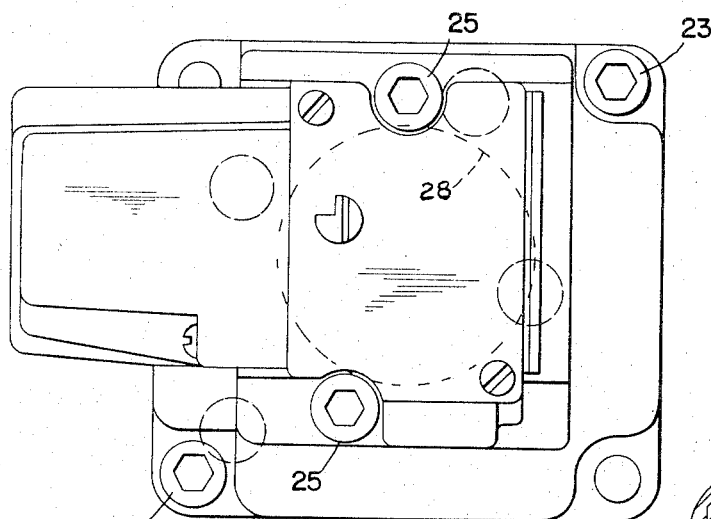
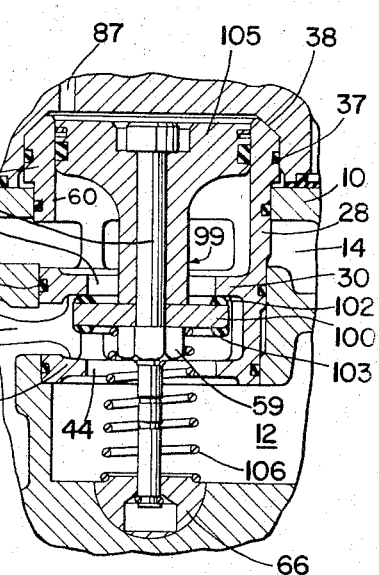
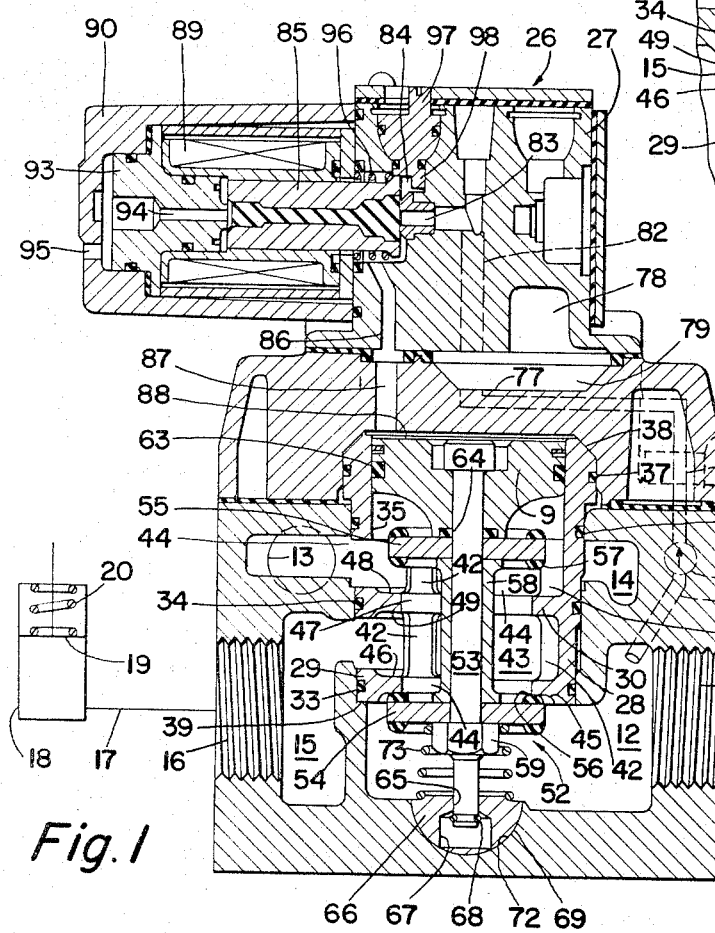

3,347,259
VALVE ASSEMBLY
Zdenek J. Lansky, Winnetka, and Kurt W. Leibfritz, Norridge, Ill., assignors to Parker-Hannifin Corporation, Cleveland, Ohio, a corporation of Ohio
Filed Nov. 10, 1966, Ser. No. 593,445
13 Claims. (Cl. 137—269)

This invention relates generally to fluid pressure operated valves that are controlled by solenoid operated pilot valves and relates more particularly to a housing assembly for such valves in which the housing may be fitted with either a fluid pressure operated valve element that is normally closed or with such a valve element that is normally open.

Valves of the general type herein involved are used for controlling flow of motive fluid to and from fluid pressure operated motors. In some such installations it is desirable to have the fluid pressure operated valve normally open, that is to have the inlet port connected to the motor port, when the solenoid is de-energized. In other installations it is desirable to have the fluid pressure operated valve normally closed, that is, to have the inlet port closed off from the motor port when the solenoid is de-energized. In the past it has been desirable to convert such a normally open valve assembly to a normally closed valve assembly by specially locating the pilot flow passages so that the flow of the pilot fluid could be rearranged for accomplishing the change from normally open to normally closed by rotating the position of the pilot valve housing with respect to the remainder of the valve housing. However, this has a disadvantage in that if the valve assembly is taken apart great care must be taken to reassemble the pilot valve to its original position in order to have the valve assembly operate as before.

It is in object of the present invention to provide a valve housing assembly usable for either a normally open or a normally closed valve without changing the relation of the pilot valve with respect to the remainder of the assembly. This is accomplished by placing a motor port chamber between the inlet and outlet chambers in the valve housing, providing a valve seat on each side of a port between the inlet and cylinder chambers and on each side of a port between the cylinder and outlet chambers and by providing alternate fluid pressure operated valve poppet elements, one of which will cooperate with two of the seats for providing a normally closed assembly and the other of which poppet elements will cooperate with the other two seats for providing a normally open assembly.

It is another object of the invention to provide a valve assembly in which the valve poppet elements are supported and guided at each end and with the support means at one end having a spherical mounting so that it may be self-aligning with respect to the valve element.

Other objects of the invention will be apparent from the following description and from the drawings in which:

FIG. 1 is a vertical cross-section view of a valve assembly having therein a normally closed fluid pressure operated valve element.

FIG. 2 is a view partly in section of a valve assembly having therein a normally open valve poppet element, and FIG. 3 is a top view of either assembly.

In the normally closed assembly of FIG. 1 there is a main housing 10 having an inlet port 11 connected to an inlet chamber 12 and an outlet port 13 connected to an outlet chamber 14. Between the inlet and outlet chambers is a motor chamber 15 connected to a motor port 16. The latter may be connected by a pipeline 17 to one end of a fluid operated motor 18 having a piston 19 therein that is movable in one direction by fluid pressure and in the opposite direction by spring 20.

Attached to housing 10 by screws 23 is an intermediate housing 24 and attached to the latter by screws 25 is a pilot valve assembly generally designated 26 and including a housing 27.

As shown in FIG. 3, screws 23 are irregularly spaced relative to cartridge 28 and because the latter extends into both intermediate housing 24 and main housing 10, these housings can be assembled in only one irregular position relative to each other. Also, screws 25 are irregularly spaced so that pilot valve housing 27 can be assembled in only one way upon intermediate housing 24.

Mounted in housing 10 so as to be a part thereof is a cylindrical cartridge 28 that has disk-like portions 29 and 30 that are sealed relative to housing 10 by O-rings 33, 34 and a cylindrical sleeve-like portion 35 that is sealed relative to the housing 10 by an O-ring 36 and that is sealed relative to intermediate housing 24 by O-ring 37. Housing 24 bears against a tapered end surface 38 of cartridge 28 to clamp the lower end of the latter against a shoulder 39 in body 10.

Cartridge 28 has axially extending ribs 42 between disk-like portions 29 and 30 and between portion 30 and sleeve portion 35 to form radial openings 43 in the cartridge that communicate with motor chamber 15 and radial openings 44 that communicate with outlet chamber 14. Disk portion 29 has a port 44 therethrough and valve seats 45, 46 on either side thereof. Likewise, disk 30 has a port 47 therethrough with valve seats 48, 49 on either side thereof.

In the normally closed arrangement of FIG. 1 there is a fluid pressure operated valve poppet element generally designated 52. It includes a stem 53 having mounted thereon spaced disks 54, 55 respectively having bonded thereto resilient members providing valve surfaces 56, 57. Disks 54, 55 are held apart by a spacer 58 and are clamped in position by a nut 59 threaded onto stem 53.

Attached to the upper end of stem 53 is a piston 9 whose outer periphery has a close sliding fit with the cylindrical wall 60 of cartridge sleeve portion 35 and is sealed relative thereto by an O-ring 63 and is sealed relative to stem 53 and disk 55 by an O-ring 64.

At its lower end stem 53 has a sliding fit within bore 65 of a bushing 66 and projects into bushing counterbore 67. An O-ring 68 projects from a groove in stem 53 and engages the bottom of counterbore 67 when poppet element 52 is outside of housing 10 to prevent separation of bushing 66 from stem 53. Bushing 66 has a part spherical surface 69 seated in an internal part spherical recess 72 in housing 10 and may pivot or swivel therein as necessary for bore 65 to become aligned with stem 53. A spring 73 bears against bushing 66 to keep the latter seated in recess 72 and also bears against disk 54 to urge poppet element 52 toward its upper position as shown.

Housing 10 has a duct 74 leading from inlet chamber 12 and has a check valve 75 therein. Duct 74 connects with another duct 76 in housing 24 and the latter connects with a recess 77 also in housing 24, which with recess 78 in housing 27 form a volume chamber 79. Leading from volume chamber 79 is a duct 82 that connects with a duct 83 that leads to a recess 84 in which a solenoid armature 85 extends. Leading from recess 84 is another duct 86 that connects with duct 87 which in turn connects with a piston chamber 88 that has a movable wall formed by the upper face of piston 9.

Surrounding armature 85 is a solenoid coil 89 enclosed within a cover 90. Within the cover is an adapter 93 having a duct 94 therethrough that is open to a vent duct 95 through cover 90. Armature 85 serves as a valve element and is normally pressed by a spring 96 to an inner position in which it closes duct 83 and opens 94 but which when actuated by coil 89 moves outwardly to close duct 94 and open duct 83. The armature may also be moved outwardly by a manually rotatable element 97 that has an off-center projection 98 engageable with the armature for this purpose.

The normally open assembly of FIG. 2 is identical to that of FIG. 1 except that a different poppet element assembly 99 is substituted for poppet element 52. Poppet element assembly 99 includes a disk 100 having bonded to its opposite faces resilient elements providing valve surfaces 102 and 103. Disc 100 is clamped in place on stem 104 against piston 105 by nut 59 and the lower end of stem 104 is guided within bushing 66. A longer spring 105 normally urges the poppet element 99 to its upper position in which surface 102 contacts seat 49 for closing port 47 while surface 103 is away from seat 46 to open port 44.

*Operation of FIG. 1 form*

With coil 89 in de-energized condition spring 96 holds armature 85 in position for closing duct 83 and opening duct 94. This vents piston chamber 88 through ducts 87, 86, recess 84 past armature 85 and through ducts 94, 95 to atmosphere. Meanwhile, pressure fluid entering ducts 74, 76, 82 and 83 from inlet chamber 12 is cut off by armature 85 at duct 83. With no pressure in piston chamber 88, spring 73 maintains poppet element 52 in its upward position with valve surface 56 in contact with valve seat 45 for closing port 44 to prevent pressure fluid from inlet chamber 12 passing into motor chamber 15. Also, valve surface 57 is spaced from valve seat 48 to open port 47 and permit fluid from the lower end of cylinder 18 to pass through pipe 17 and motor chamber 15 through port 47 to outlet chamber 14 and outlet port 13, and thus permitting spring 20 to retract piston 19.

When coil 89 is energized, armature 85 moves to the left to close duct 94 and open duct 83 whereby pressure fluid in the latter passes into recess 84 and through ducts 86 and 87 to piston chamber 88 where it acts on the upper face of piston 9 to move poppet valve element 52 downward until valve surface 57 contacts seat 48 to close port 47 and valve surface 57 moves away from valve seat 45 to open port 44. This permits pressure fluid to flow from inlet chamber through port 44 to motor chamber 15 and through port 16 and pipe 17 to the lower end of motor 18 for extending piston 19.

*Operation of FIG. 2 form*

In the operation of the normally open assembly of FIG. 2, piston chamber 88 is vented to atmosphere through duct 95 when coil 89 is in deenergized condition, as described above. With no pressure in piston chamber 88 spring 106 maintains poppet element 99 in its upper position with valve surface 102 in contact with seat 49 for closing port 47 and with surface 103 spaced from seat 46 for opening port 44. Thus inlet chamber 12 is normally open through port 44 to motor chamber 15.

When coil 89 is energized, armature 85 closes duct 94 and opens duct 83 to permit pressure fluid to enter piston chamber 88 and move valve element 99 downward until valve surface 103 contacts seat 46 to close port 44 and spacing surface 102 from seat 49 to open port 47. This cuts off the supply of fluid from inlet chamber 12 to motor chamer 15 and permits the latter to be exhausted through port 47 and exhaust chamber 14 and port 13.

We claim:

1. A valve assembly comprising a housing having inlet, outlet and motor chambers, each connected to the housing exterior and the motor chamber being between the inlet and outlet chambers, an inlet port and an outlet port, said outlet port being between the motor and outlet chambers and coaxial with the inlet port, a first seat on the inlet chamber side of the inlet port and a second seat on the outlet chamber side of the outlet port, a first replaceable poppet valve element in said housing and having spaced first and second poppet surfaces and being movable between first and second positions, said element in said first position having its first surface engaged with the first seat to close said inlet port and having its second surface spaced from the second seat to open said outlet port, said element in said second position having its first surface spaced from the first seat to open the inlet port and having its second surface engaged with the second seat to close said outlet port, said housing having a third seat on the motor chamber side of the inlet port and a fourth seat on the motor chamber side of the outlet port, said first valve element being replaceable by a second valve element having axially spaced third and fourth poppet surfaces and movable between first and second positions, said second element when in said first position having its third surface spaced from said third seat to open said inlet port and its fourth surface engaged with said fourth seat to close said outlet port, and said second element when in its second position having its third surface engaged with said third seat to close said inlet port and its fourth surface spaced from the fourth seat to open said outlet port, and means for moving the poppets between their first and second positions.

2. The valve assembly of claim 1 in which said last mentioned means includes a piston chamber in the housing, a piston on each of the valve elements receivable within said piston chamber, and means for introducing and exhausting fluid under pressure to and from said piston chamber.

3. The valve assembly of claim 1 in which said seats are on a single cartridge member insertable within said housing.

4. The valve assembly of claim 3 in which said cartridge also provides a cylindrical wall of said piston chamber.

5. The valve assembly of claim 1 in which said first valve element has a central stem and first and second axially spaced disks projecting radially from said stem and respectively carrying said first and second poppet surfaces.

6. The valve assembly of claim 1 in which said last mentioned means includes fluid pressure operated means for moving the poppet elements to one of their positions and a spring for moving the poppet elements to the other of their positions.

7. A housing assembly for a valve, said assembly including a housing having inlet and outlet chambers within a motor chamber extending therebetween, an inlet port between the inlet and motor chambers and an outlet port between the motor and outlet chambers, a first seat on the inlet chamber side of the inlet port and a second seat on the outlet chamber side of the outlet port, a third seat on the motor chamber side of the inlet port and a fourth seat on the motor chamber side of the outlet port, said first and second seats being cooperable with a first poppet valve element replaceably and movably mountable in said housing for respectively closing and opening said inlet and outlet ports when the element is in a retracted position and respectively opening and closing said inlet and outlet ports when the element is in an extended position, said third and fourth seats being cooperable with a second poppet valve element movably mounted in the housing as a replacement for the first poppet valve element for respectively opening and closing said inlet and outlet ports when the second element is in a retracted position and respectively closing and opening said inlet and outlet ports when the second element is in an extended position, and said housing assembly including means for moving either element between its retracted and extended positions.

8. The housing assembly of claim 7 in which said last mentioned means includes a piston chamber for directing fluid under pressure to a piston surface on each valve element, and a pilot valve assembly for directing and exhausting pressure fluid to and from the piston chamber, said pilot valve assembly having the same position relative to the housing regardless of which of said valve elements is mounted within the housing.

9. The housing assembly of claim 8 in which the piston chamber is in one end of said housing and said seats are in an opposite end of said housing and pressure fluid admitted to said piston chamber moves either valve element then within the housing to its extended position.

10. The housing assembly of claim 8 in which the pressure fluid directed to the piston chamber acts on the piston surface of the valve element then mounted in the housing to move the latter element to its extended position, and there is a spring for returning the latter element to its retracted position when pressure fluid is exhausted from the piston chamber.

11. A valve assembly comprising a housing having inlet, outlet and motor chambers, an inlet port, between the inlet and motor chambers, a second port between the motor and outlet chambers, a valve element movable in the housing between first and second positions, said element having means thereon for alternately opening and closing said ports when moved to said positions, a cylindrical piston chamber in one end of the housing beyond said chambers, a bored bushing in the other end of the housing beyond said chambers, said valve element having a piston at one end thereof slidably fitted in said piston chamber, and a stem at its other end slidably fitted within said bushing bore, said bushing having a part spherical external surface bearing against a mating part spherical internal surface of said housing whereby said bushing may pivot about its center of sphericity for aligning said bore with said stem.

12. The valve assembly of claim 11 in which there is a spring having one end bearing against the valve element and urging it toward one of its positions and having its other end bearing against the bushing and urging the latter against said internal spherical surface.

13. The valve assembly of claim 11 in which the bushing has a counterbore, said stem extends through said bore and into said counterbore, and removable abutment means on said stem engageable with the bottom of the counterbore for retaining the bushing on said stem when the valve element is removed from said housing.

References Cited
UNITED STATES PATENTS 3,176,954   4/1965   Cameron et al. ____ 137—269 X M. CARY NELSON, *Primary Examiner.*

R. J. MILLER, *Assistant Examiner.*